United States Patent
Nachimuthu et al.

(10) Patent No.: US 10,791,174 B2
(45) Date of Patent: Sep. 29, 2020

(54) MECHANISM FOR EFFICIENT DISCOVERY OF STORAGE RESOURCES IN A RACK SCALE ARCHITECTURE SYSTEM

(71) Applicants: Murugasamy K. Nachimuthu, Beaverton, OR (US); Mohan J. Kumar, Aloha, OR (US)

(72) Inventors: Murugasamy K. Nachimuthu, Beaverton, OR (US); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 227 days.

(21) Appl. No.: 15/221,707

(22) Filed: Jul. 28, 2016

(65) Prior Publication Data
US 2018/0034909 A1 Feb. 1, 2018

(51) Int. Cl.
*H04L 29/08* (2006.01)
*H04L 12/24* (2006.01)

(52) U.S. Cl.
CPC ...... *H04L 67/1097* (2013.01); *H04L 41/0813* (2013.01)

(58) Field of Classification Search
None
See application file for complete search history.

(56) References Cited

U.S. PATENT DOCUMENTS

| | | | | |
|---|---|---|---|---|
| 8,904,146 B1* | 12/2014 | Lazar | ................. | G06F 12/0223 711/117 |
| 8,930,542 B2* | 1/2015 | Ashok | ................... | G06F 9/5072 709/223 |
| 9,154,589 B1* | 10/2015 | Klein | .................... | H04L 69/329 |
| 2012/0008945 A1* | 1/2012 | Singla | ................. | H04J 14/0204 14/204 |
| 2015/0186319 A1* | 7/2015 | Blevins | ............... | G06F 13/4068 710/301 |
| 2015/0341230 A1* | 11/2015 | Dave | ................... | H04L 41/5058 705/7.29 |
| 2017/0024450 A1* | 1/2017 | Narayanan | ........ | G06F 17/30581 |
| 2017/0026263 A1* | 1/2017 | Gell | .................... | H04L 43/0882 |
| 2017/0149931 A1* | 5/2017 | Lochhead | ........... | H04L 41/0896 |
| 2019/0095294 A1* | 3/2019 | Davis | ................. | G06F 11/2092 |

* cited by examiner

*Primary Examiner* — Thomas J Dailey
(74) *Attorney, Agent, or Firm* — Law Office of R. Alan Burnett, P.S

(57) ABSTRACT

Mechanisms for efficient discovery of storage resources in a Rack Scale Architecture (RSA) system and associated methods, apparatus, and systems. A rack is populated with pooled system drawers including pooled compute drawers and pooled storage drawers communicatively coupled via input-output (IO) cables. Compute nodes including one or more processors, memory resources, and optional local storage resources are installed in the pooled compute drawers, and are enabled to be selectively-coupled to storage resources in the pooled storage drawers over virtual attachment links. During a discovery process, a compute node determines storage resource characteristics of storage resources it may be selectively-coupled to and the attachment links used to access the storage resources. The storage resource characteristics are aggregated by a pod manager that uses corresponding configuration information to dynamically compose compute nodes for rack users based on user needs.

30 Claims, 12 Drawing Sheets

MECHANISM FOR EFFICIENT DISCOVERY OF STORAGE RESOURCES IN A RACK SCALE ARCHITECTURE SYSTEM

BACKGROUND INFORMATION

The availability and use of "Cloud" computing has expanded exponentially in the past few years. Under a conventional computing approach, users run software applications on their own computers and/or access software services hosted by local servers (such as servers run by a business enterprise). In contrast, under cloud computing the compute and storage resources are "in the cloud," meaning they are physically hosted at a remote facility that is accessed via a computer network, such as the Internet. Compute and storage resources hosted by a cloud operator may be accessed via "services," which are commonly referred to as cloud-based services, Web services or simply services.

Cloud-based services are typically hosted by a datacenter that includes the physical arrangement of servers that make up a cloud or a particular portion of a cloud. Data centers commonly employ a physical hierarchy of compute, network and shared storage resources to support scale out of workload requirements. FIG. 1 shows a portion of an exemplary physical hierarchy in a data center 100 including a number L of pods 102, a number M of racks 104, each of which includes slots for a number N of trays 106. Each tray 106, in turn, may include multiple sleds 108. For convenience of explanation, each of pods 102, racks 104, and trays 106 is labeled with a corresponding identifier, such as Pod 1, Rack 2, Tray 1B, etc. Trays may also be referred to as drawers, and sleds may also have various forms, such as modules and nodes. In addition to tray and sled configurations, racks may be provisioned using chassis in which various forms of servers are installed, such as blade server chassis and server blades.

Depicted at the top of each rack 104 is a respective top of rack (ToR) switch 110, which is also labeled by ToR Switch number. Generally, ToR switches 110 are representative of both ToR switches and any other switching facilities that support switching between racks 104. It is conventional practice to refer to these switches as ToR switches whether or not they are physically located at the top of a rack (although they generally are).

Each Pod 102 further includes a pod switch 112 to which the pod's ToR switches 110 are coupled. In turn, pod switches 112 are coupled to a data center (DC) switch 114. The data center switches may sit at the top of the data center switch hierarchy, or there may be one or more additional levels that are not shown. For ease of explanation, the hierarchies described herein are physical hierarchies that use physical LANs. In practice, it is common to deploy virtual LANs using underlying physical LAN switching facilities.

The cloud-hosted services are generally categorized as Software as a Service (SaaS), Platform as a Service (PaaS), and Infrastructure as a Service (IaaS). SaaS services, also commonly called Web services and cloud application services, enable access to services running on datacenter servers via a network connection and client-side interface, such as a Web browser. Well-known examples of SaaS services include e-mail Web services (e.g., Google gmail, Microsoft Hotmail, Yahoo mail), Microsoft Office 365, Salesforce.com and Google docs. PaaS, also known as cloud platform services, are used for applications and other development, while providing cloud components to software. Examples of PaaS include Amazon Web Services (AWS) Elastic Beanstalk, Windows Azure, and Google App Engine.

IaaS are services for accessing, monitoring, and managing remote datacenter infrastructures, such as computer (virtualized or bare metal), storage, networking, and networking services (e.g., Firewalls). Instead of purchasing and running their own physical hardware, users can purchases IaaS based on consumption. For example, AWS and Windows Azure respectively offer use of Amazon and Microsoft datacenter resources on a resource allocation/consumption basis. Amazon Elastic Compute Cloud (EC2) is a central part of AWS.

IaaS usage for a given customer typically involves allocation of data center resources. For example, a typical AWS user may request use of one of 24 different EC2 instances, which range from a t2.nano instance with 0.5 Gigabyte (GB) of memory, 1 core/variable cores/compute units and no instance storage to an hs1.8xlarge with 117 GB of memory, $16/35$ cores/compute units and 48000 GB of instance storage. Each allocated EC2 instance consumes certain physical datacenter resources (e.g. compute, memory storage). At the same time, datacenter racks may support a multitude of different configurations. To maximum resource allocation, the IaaS operator needs to track what resources are available in which rack.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
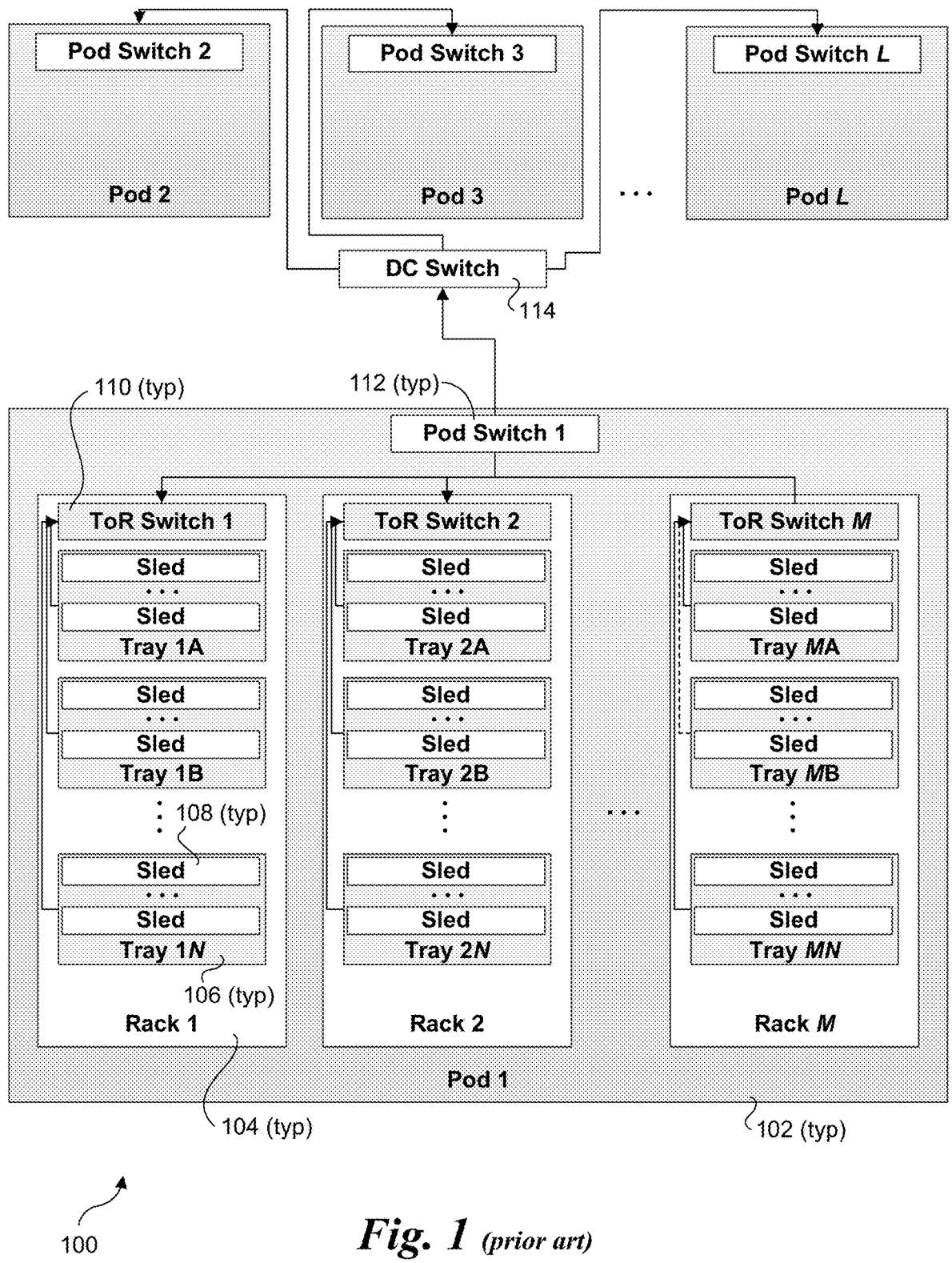
FIG. 1 is a schematic diagram of a conventional physical rack configuration in a data center.

Embodiments of mechanisms for efficient discovery of input-output (10) Resources in A Rack Scale Architecture System and associated methods, apparatus, and systems are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Recently, Intel® Corporation introduced new rack architecture called Rack Space Architecture (RSA). Rack Scale Architecture is a logical architecture that disaggregates compute, storage, and network resources and introduces the ability to pool these resources for more efficient utilization of assets. It simplifies resource management and provides the ability to dynamically compose resources based on workload-specific demands.

RSA uses compute, fabric, storage, and management modules that work together to enable selectable configuration of a wide range of virtual systems. The design uses four basic pillars, which can be configured based on the user needs. These include 1) a Pod Manager for multi-rack management, comprising firmware and software APIs that enable resource and policy management and expose the hardware below and the orchestration layer above via a standard interface; 2) a Pooled system of compute, network, and storage resources that may be selectively composed based on workload requirements; 3) Pod-wide storage built on connected storage uses storage algorithms to support a range of usages deployed as a multi-rack resource or storage hardware and compute nodes with local storage; and 4) a configurable network fabric of hardware, interconnect with cables and backplanes, and management software to support a wide range of cost-effective network topologies, including current top-of-rack switch designs and distributed switches in the platforms.

Figure 2:
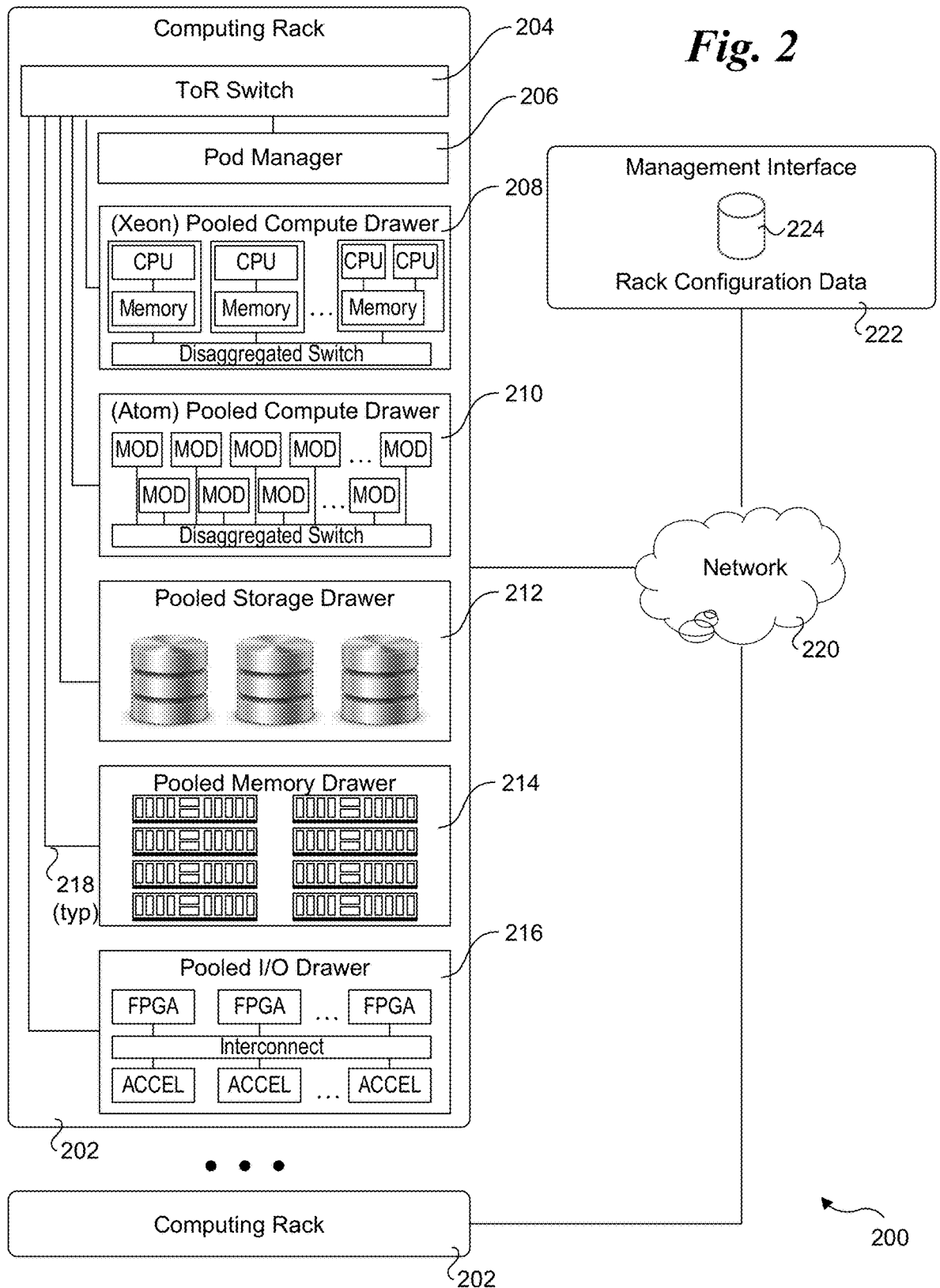
FIG. 2 is a schematic diagram of a Rack Scale Architecture (RSA) configuration in a data center, according to one embodiment.

An exemplary RSA environment 200 is illustrated in FIG. 2. RSA environment 200 includes multiple computing racks 202, each including a ToR switch 204, a pod manager 206, and a plurality of pooled system drawers. Generally, the pooled system drawers may include pooled compute drawers and pooled storage drawers. Optionally, the pooled system drawers may also include pooled memory drawers and pooled Input/Output (I/O) drawers and. In the illustrated embodiment the pooled system drawers include an Intel® Xeon® pooled computer drawer 208, and Intel® Atom® pooled compute drawer 210, a pooled storage drawer 212, a pooled memory drawer 214, and an pooled I/O drawer 216. Each of the pooled system drawers is connected to ToR switch 204 via a high-speed link 218, such as a 40 Gigabit/second (Gb/s) or 100 Gb/s Ethernet link or an 100+Gb/s Silicon Photonics (SiPh) optical link. In one embodiment high-speed link 218 comprises an 800 Gb/s SiPh optical link.

Multiple of the computing racks 200 may be interconnected via their ToR switches 204 (e.g., to a pod-level switch or data center switch), as illustrated by connections to a network 220. In some embodiments, groups of computing racks 202 are managed as separate pods via pod manager(s) 206. In one embodiment, a single pod manager is used to manage all of the racks in the pod. Alternatively, distributed pod managers may be used for pod management operations.

RSA environment 200 further includes a management interface 222 that is used to manage various aspects of the RSA environment. This includes managing rack configuration, with corresponding parameters stored as rack configuration data 224.

Figure 3:
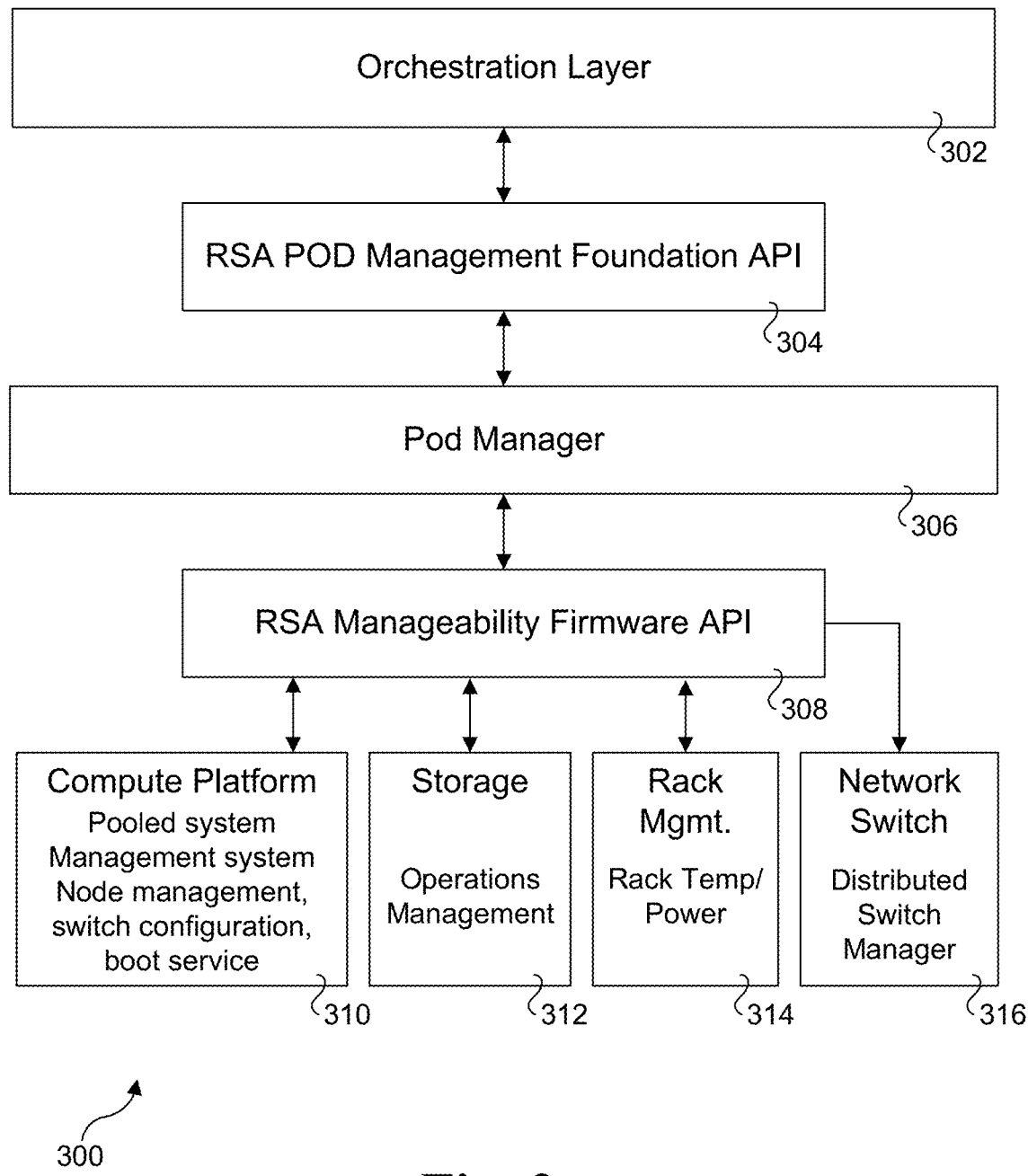
FIG. 3 is a block diagram of an RSA management architecture, according to one embodiment

FIG. 3 shows one embodiment of a RSA management architecture 300. The RSA management architecture includes multiple software and firmware components configured in a layered architecture including an orchestration layer 302, an RSA pod management foundation API (Application Program Interface), a pod manager 306, and an RSA manageability firmware API 308. The bottom layer of RSA management architecture includes a compute platform management component 310, a storage management component 312, a, a rack management components 314, and a network switch management component 316.

The compute platform management component 310 performs operations associated with compute drawers and includes a pooled system, a management system, node management, switch configuration, and boot service. Storage management component 312 is configured to support operation management of pooled storage drawers. Rack management component 314 is configured to manage rack temperature and power sub-systems. Network switch management component includes a distributed switch manager.

Intel® Rack Scale Architecture is designed to change the focus of platform architecture from single servers to converged infrastructure consisting of compute, network and storage, as discussed above and illustrated in FIG. 2. Management of resources is performed at the rack level and pod level. Focus on management of resources at the rack level also requires management of rack level environments such as power and cooling zones as well as providing a rack level root of trust for relative location information. This role is fulfilled by Rack Management Module (RMM), along with a sub-rack unit (the drawer units in RSA terminology) manager (a drawer manager) called a Pooled System Management Engine (PSME). The management elements of RSA, RMM and PSMEs are connected to a private network that is not accessible external to the rack, as shown in FIG. 4 and discussed below.

Figure 4:
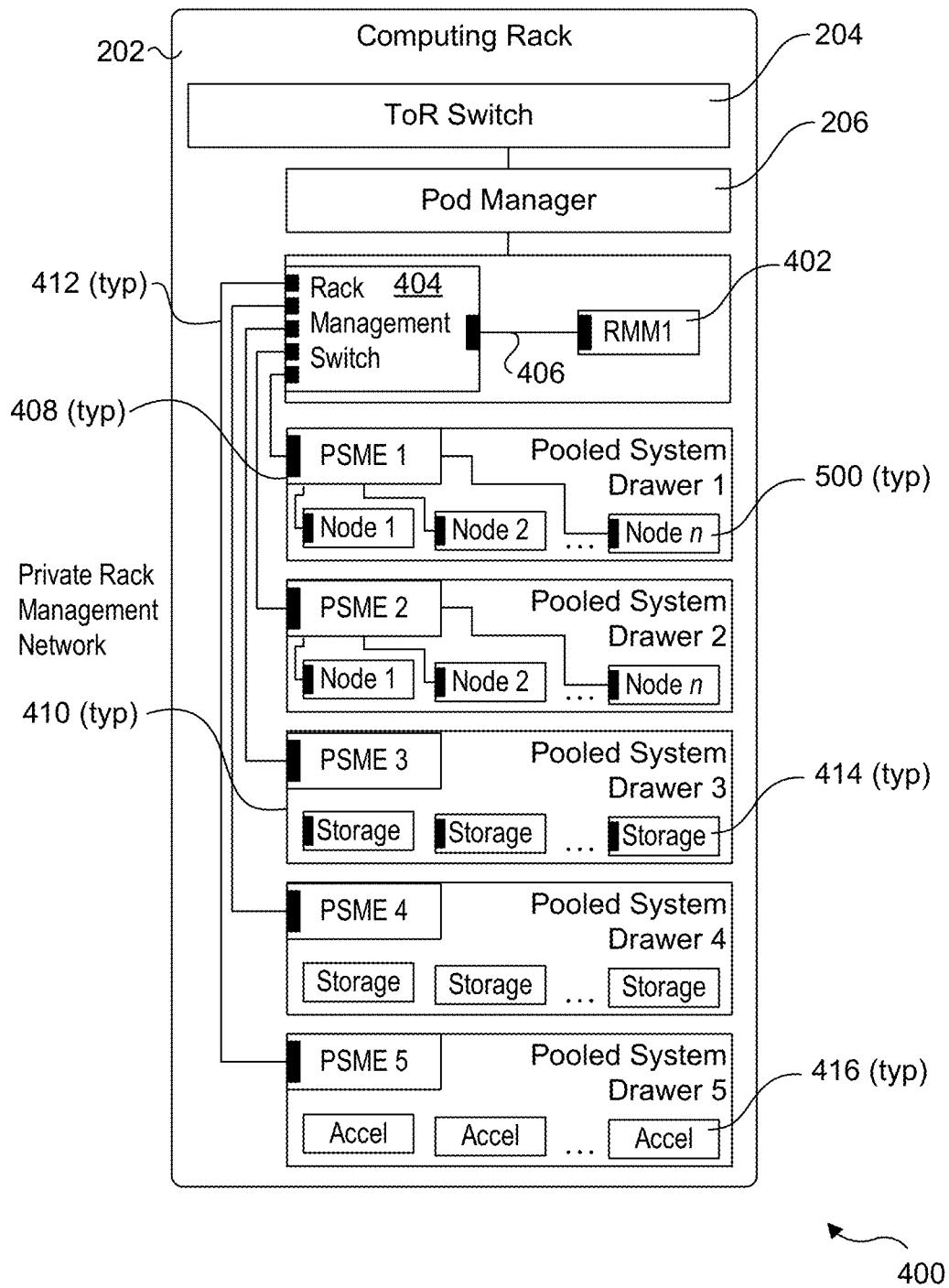
FIG. 4 is a schematic diagram showing further details of an RSA rack implementing Pooled System Management Engines (PSMEs)

FIG. 4 shows one embodiment of a rack configuration 400 employing rack management and configuration components that communicate over a private rack management network. The rack management and configuration components include an RMM 402 coupled in communication with a rack management switch 404 via a link 406. A respective PSME 408 is associated with each of five pooled system drawers 410. Each PSME 408 is connected to rack management switch 404 via a link 412. The rack management switch is also connected to POD Manager 206. In the illustrated embodiment, each of pooled system drawers 1 and 2 includes a plurality of compute nodes 500, while pooled system drawers 3 and 4 includes a plurality of storage resources 414 and pooled system drawer 5 includes a plurality of IO accelerator resources 416.

In a datacenter environment such as RSA, the data center management software is able to compose various rack resources into a compute instance(s) or compute node that meets user performance requirements. In general, over allocation of resources to meet the performance results in inefficient utilization of the rack resource, leading to higher total cost of ownership (TCO) and lower return on investment (ROI).

In traditional compute nodes, the baseboard management controller (BMC) can retrieve the memory DIMM (dual in-line memory module) configuration through an out-of-band channel or by communicating with the server's BIOS. However, storage (e.g., solid-state drive (SSD) or hard disk) capacity or health are not collected by the BIOS, hence the BIOS/BMC approach is unable to provide this information to the PSME or Pod Manager. This leads to RSA management software being unable to determine the storage capacity and health for a node. As a result, this storage-related data either has to be manually entered or collected using various software agents and/or services running on the nodes that send collected information to a rack management entity via a data network, which results in heavy overhead for collecting storage-related data. This also causes a permanent impact on boot time, thus reducing benefits associated with bare metal provisioning.

To address this problem, embodiments herein provide a mechanism to improve the boot time of composed systems and hence the overall responsiveness to bare metal provisioning requests. In RSA environments, compute nodes may be composed of resources that are in separate (from the compute nodes' CPUs) pooled system drawers. For example, an IO drive, such as a PCIe (Peripheral Component Interconnect Express) drive could be assigned from a pooled IO or storage drawer. The embodiments also provide a mechanism for detecting the scope of the server platform resources vs. resources that are materialized via composition, which further improves boot time for deep discovery.

In accordance with aspects of one embodiment, information regarding memory capacity, health, memory performance and link performance and storage capacity, health, storage performance and link performance is provided to a PSME from compute nodes when the PSME instructed the nodes to do deep discovery. The PSME then communicates corresponding information to the POD Manager (PODM), which is a configuration management entity that is responsible for composing the system based on user needs.

Figure 5:
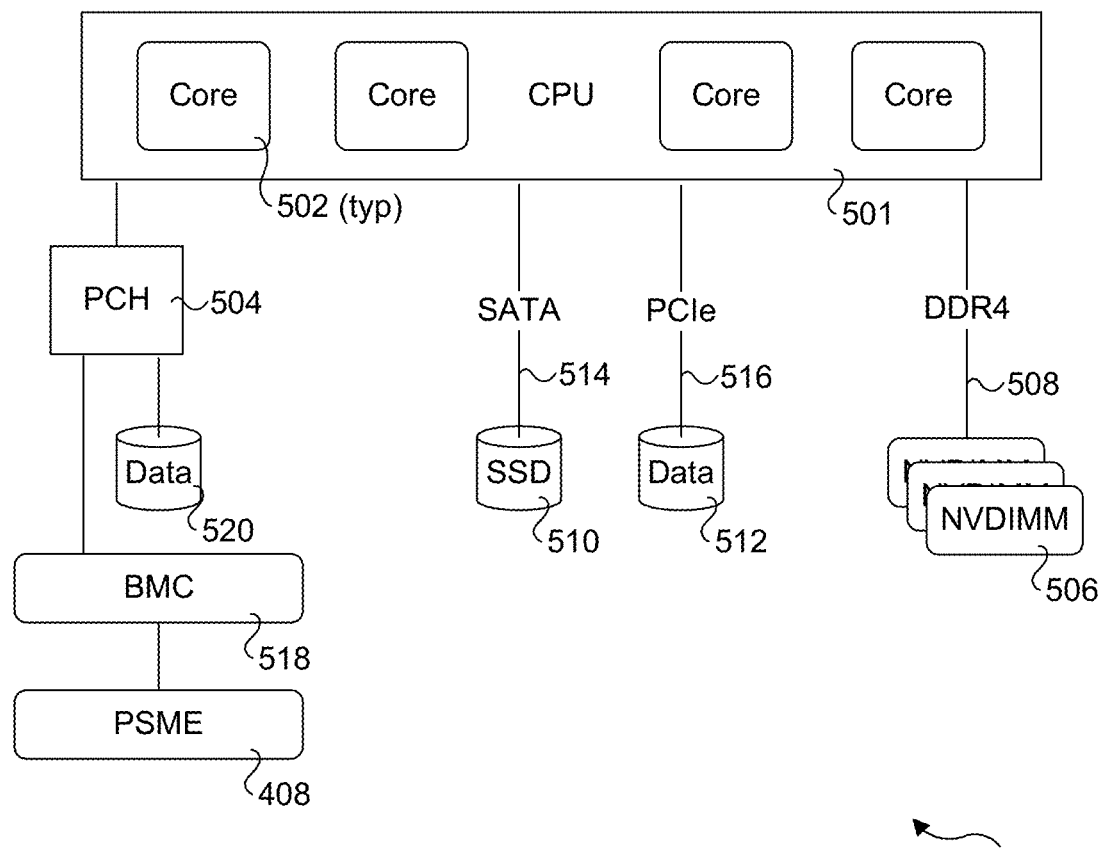
FIG. 5 is a schematic diagram illustrating an exemplary configuration of a compute node including a CPU coupled to multiple local IO resources.

A configuration for one embodiment of a compute node 500 is shown in FIG. 5. Compute node 500 employs a CPU 501 including multiple cores 502 coupled to a platform controller hub (PCH) 504 and to one or more non-volatile DIMMs (NVDIMMs) 506 via a DDR4 (double data rate generation 4) memory interface 508. CPU 502 is also connected to one or more local storage resources via respective storage links, as depicted by an SSD 510 and storage device 512 via a Serial ATA (SATA) channel 514 and a PCIe link 516. PCH 504 is connected to a BMC 518 and to a storage device 520. BMC 518 is connected to a PSME 408 for the storage drawer that compute node 500 is installed in (not shown). In some embodiments, CPU 501 employs a System on a Chip (SoC) architecture and includes various built-in (to the chip) interfaces for communicating with various IO resources coupled to the CPU.

Generally, during hardware resource provisioning (also referred to herein a bare metal provisioning), hardware resources such as compute nodes are composed and allocated to meet user usage requests. In some cases, all of the resources for a server blade, server module, or similar server unit are allocated for a given request. In some cases, the compute nodes comprise virtualized compute nodes running on underlying hardware, such as through use of a Type 1 (aka bare metal) hypervisor. Other virtualization schemes may also be used such as those that use virtual machine managers (VMMs), as well as container-based virtualization.

Figure 6:
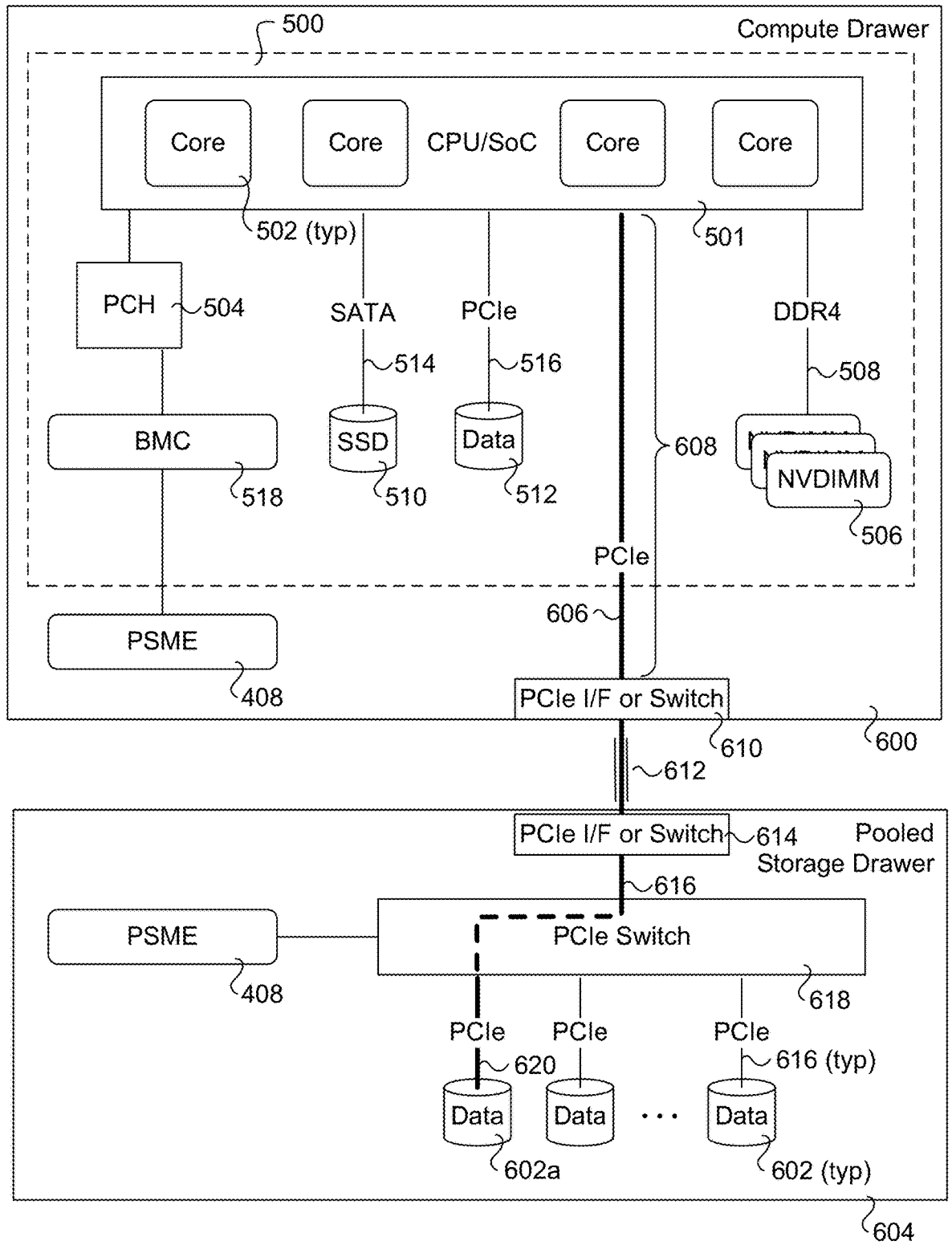
FIG. 6 is a schematic diagram illustrated an exemplary configuration of a compute node in a pooled compute drawer that is configured to be selectively-coupled to storage resources in a pooled storage drawer.

In addition to allocating all or a portion of resources for a server blade or server module, RSA supports composing compute nodes that include hardware resources from two or more pooled system drawers. For example, FIG. 6 shows an implementation in which a compute node 500 in a compute drawer 600 is composed to be selectively-coupled to one or more storage resources 602 in a pooled storage drawer 604. Generally, communication between components in RSA system drawers may employ IO infrastructure in accordance with existing and future IO protocols and components, including IO interconnect hierarchies, IO interfaces, IO links, etc. In one embodiment, communication between components in RSA system drawers employs PCIe infrastructure (e.g., PCIe root complexes and interconnect hierarchies, interfaces, and links). From the viewpoint of a CPU (aka compute node) in a compute drawer accessing a storage device in separate storage drawer, it appears it is directly coupled to the storage resource. In practice, these are implemented as virtual links that include multiple PCIe segments in combination with applicable PCIe interfaces and switches. As used herein, a virtual or physical link that attaches an IO resource, such as a storage device, to a compute node is called an attachment link.

In FIG. 6, one such attachment link is shown as an attachment link 606 coupled between CPU 501 and a storage resource 602a. CPU 501 is also labeled CPU/SoC to indicate that the CPU employs an SoC architecture, which includes one or more PCIe interfaces on the CPU/SoC (not shown). Attachment link 606 includes multiple link segments coupled between PCIe infrastructure components, comprising a PCIe link segment 608 coupled between CPU 501 and a PCIe interface (I/F) or switch 610, a PCIe cable 612 coupled between PCIe interface or switch 610 and a PCIe interface or switch 614. Within pooled storage drawer 604 virtual link 606 further includes a link segment 616 coupled between PCIe interface or switch 614 and a PCIe switch 618, and a PCIe link 620 coupled between PCIe switch 618 and storage resource 602.

Figure 7A:
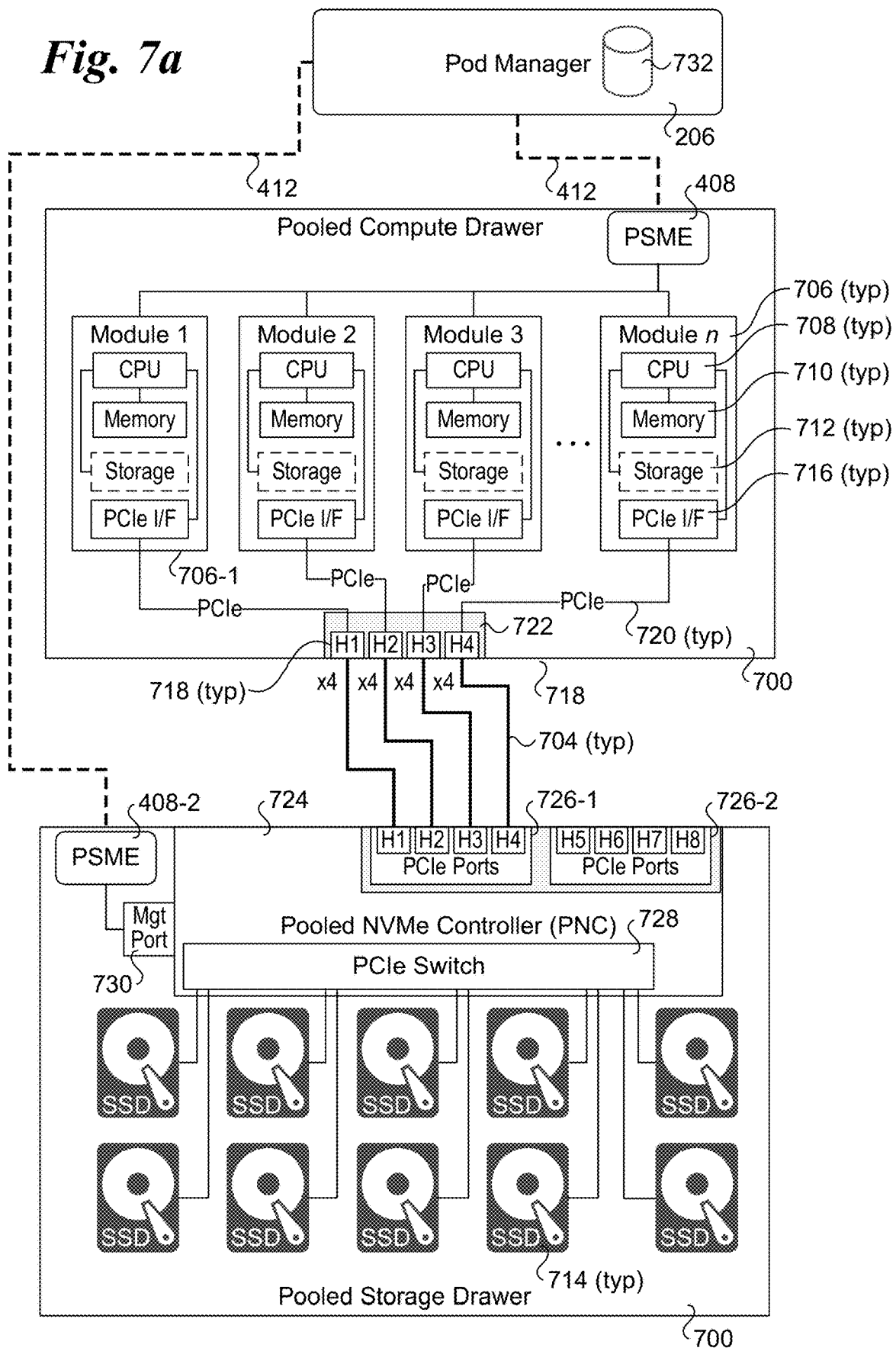
FIG. 7a is a schematic diagram illustrating a pooled compute drawer connected to a pooled storage drawer using multiple PCIe cables, according to one embodiment.
Figure 7B:
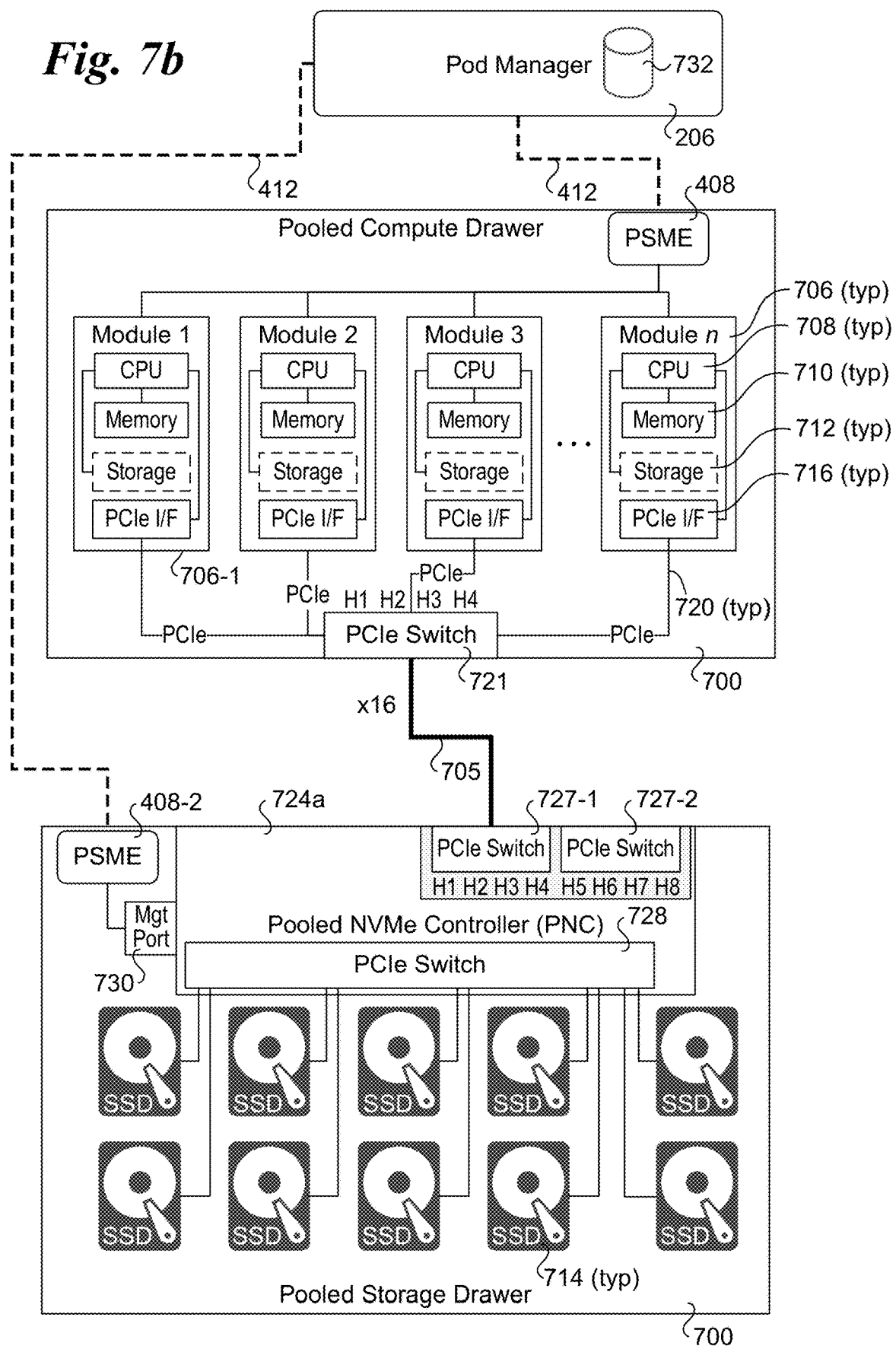
FIG. 7b is a schematic diagram illustrating a pooled compute drawer connected to a pooled storage drawer using a single PCIe cable coupled between PCIe switches, according to one embodiment.

Further details of two exemplary attachment link configurations are shown in FIGS. 7a and 7b. FIG. 7a depicts a pooled compute drawer 700 communicatively coupled to a pooled storage drawer 702 via a plurality of PCIe cables 704. In general, a pooled compute drawer may include multiple compute nodes, each including one or more CPUs. For example, such compute nodes include but are not limited to server blades and server modules. In the illustrated embodiment, pooled compute drawer 700 includes a plurality of server modules 706, each including one or more CPUs 708 (only one is shown for simplicity) and memory 710. In addition, a server module may include other components, including local (i.e., on-board) storage 712. In some embodiments, server modules 706 have a similar configuration to compute node 500; for simplicity, the additional components illustrated in FIGS. 5 and 6 are not shown in FIGS. 7a and 7b, but it will be understood that such components may be present.

Under a conventional rack architecture, such as shown in FIG. 1, a server module is a self-contained server unit that has its own, predefined set of resources. Under the disaggregated pooled resource rack architecture employed by RSA, compute nodes in pooled compute drawers may be composed to include resources in other pooled system drawers, such as shown in FIG. 6 and discussed above. For example, this concept may be used to selectively compose the storage capacity for server modules 706. In FIGS. 7a and 7b storage resources that are allocated or assigned are in pooled storage drawer 702, which is separate from the pooled compute drawer 700 in which server modules 706 are installed. Generally, various types of storage resources may be used, including but not limited to devices employing non-volatile memory (NVMe), such as solid state drives (SSDs) 714 and card-based NVMe devices, as well as other types of mass storage devices, including magnetic disk drives and optical disk drives.

Each of pooled compute drawer 700 and pooled storage drawer 702 includes PCIe-based infrastructure to facilitate communication between server modules 706 and storage devices in pooled storage drawer 702. Each of server modules 706 includes a PCIe interface (I/F) 716 that is interconnected to a PCIe host port 718 by a respective PCIe interconnect 720. Each PCIe host port 718 is a PCIe port including a PCIe connector that is configured to be coupled to a PCIe cable, and is installed in a connection panel 722. In one embodiment, PCIe interconnects 720 are integrated in a backplane, mid-plane, or base-plane board into which server modules 706 are installed or otherwise coupled (using applicable connectors, not shown).

The PCIe infrastructure in pooled compute drawer 700 and PCIe cables 704 are used to facilitate PCIe communications between server modules 706 and other components in pooled system drawers that are external to pooled computer drawer 700, such as SSDs 714 in pooled storage drawer 702. Under the embodiment illustrated in FIG. 7a, these communications are facilitated through use of a pooled NVMe controller (PCN) 724. PNC 724 includes one or more sets of PCIe host ports 726 (depicted as PCIe host ports 726-1 and 726-2), an embedded PCIe switch 728, and a management port 730. However, the use of a PCN is non-limiting, as other configurations may also be implemented.

In one embodiment, each of PCIe host ports 726-1 and 726-2 include four host ports, as depicted by host ports H1, H2, H3, H4, H5, H6, H7, and H8. As shown in FIG. 7a, PCIe host ports 718 include host ports H1, H2, H3, and H4, each of which is linked in communication with a respective host port H1, H2, H3, and H4 of PCIe host ports 726-1 by a PCIe cable 704. In FIG. 7a, PCIe cables 704 are individual cables. Optionally, bundled PCIe cables may be used. In the embodiment illustrated in FIG. 7a, four 4-lane (×4) PCIe cables are used. However, this is merely exemplary, as the number of PCIe lanes supported by a PCIe cable may be any number of lanes supported by a current or future PCIe standard.

An optional configuration for interconnecting two pooled system drawers using PCIe cabling is shown in FIG. 7b. Under this configuration, PCIe interfaces 716 in pooled compute drawer 700 are interconnected to a PCIe switch 721, which is also referred under RSA as a disaggregated switch. PCIe switch 721 is connected via a PCIe ×16 cable 705 to a PCIe switch 727-1 on a PNC 724a. PNC 728a further includes a second PCIe switch 727-2 having a similar configuration to PCIe switch 727-1.

Returning to FIG. 7a, PNC 724 is connected to a PSME 408-2 via management port 730. Similarly, in FIG. 7b PNC 724a is connected to a PSME 408-2 via management port 730. Each of a PSME 408-1 in pooled compute drawer 700 and PSME 408-2 are connected to POD manager 206 via a private network link 412. Various configuration information 732 for the pooled system drawers managed by POD manager 206 are stored either locally in the POD manager, or elsewhere on the private network.

As discussed above, an aspect of the discovery process includes link performance. For example, the performance of SATA link 514 and PCI link 516 will be very high, since these links couple SSD 510 and storage device 512 to CPU 501 over short physical links. In contrast, the link performance of attachment link 606 connecting CPU 501 to storage resource 602a in pooled storage drawer 604 will be lower due to the latency introduced by each added PCIe link segment and the various PCIe interfaces and switches.

Figure 8A:
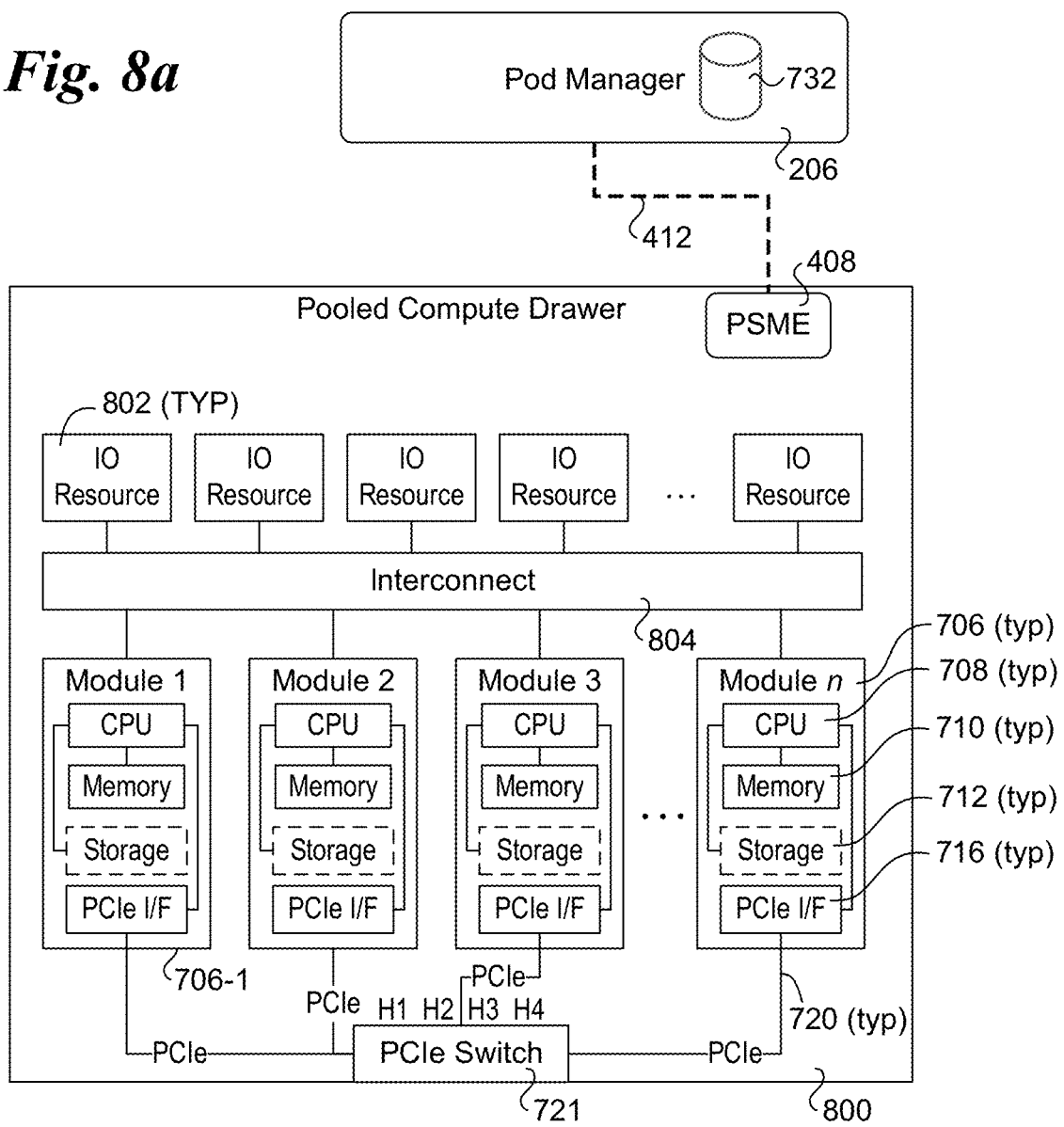
FIG. 8a is a schematic diagram illustrating a pooled compute drawer including a pooled 10 resource pool.

In addition to access to pooled IO resources in an external pooled system drawer, in some embodiments compute nodes may also be configured to use additional IO resources from a shared IO resource pool within the same pooled compute drawer as the compute node. For example, FIG. 8a shows a pooled compute drawer 800 including a shared IO resource pool including multiple IO resources 802 coupled to an interconnect 804. Under the configuration shown in FIG. 8a, each of server modules 706 is connected to interconnect 804 and may be selectively-coupled one or more available IO resources 802.

Figure 8B:
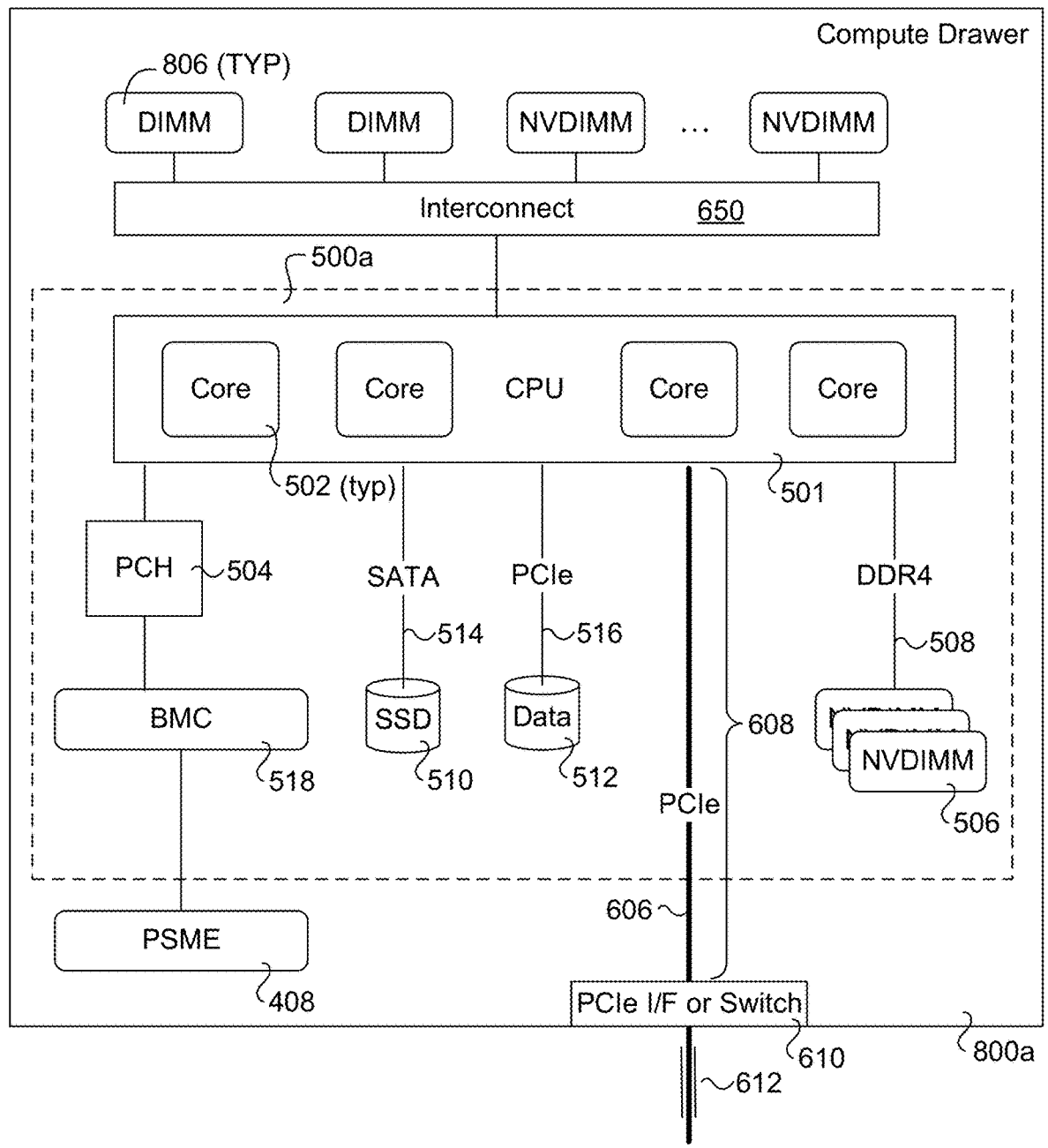
FIG. 8b is a schematic diagram illustrating an exemplary configuration of a compute node including a CPU coupled to multiple local IO resources and multiple shared memory modules.

In one embodiment, the IO resources comprise memory resource. For example, FIG. 8b illustrates a compute drawer 800a including a compute node 500a that is coupled to an interconnect 804 to which a plurality of shared memory modules 806 (e.g., DIMMs and/or NVDIMMs) are attached. In one embodiment, during the discovery process described below, compute node 500a discovers shared IO resources, such as memory modules 806, along with corresponding resource characteristics such as capacity and performance.

Figure 9:
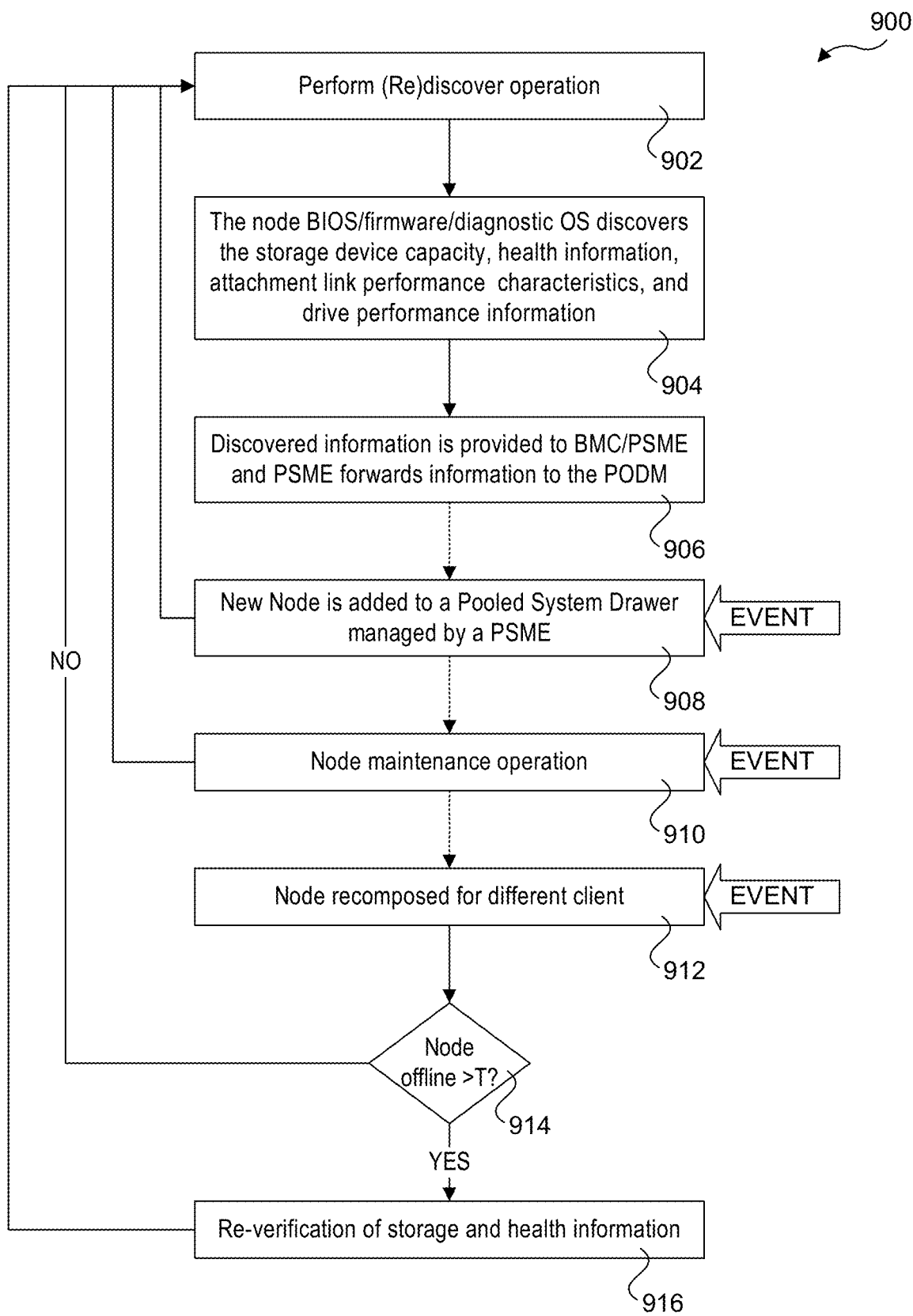
FIG. 9 is a flowchart illustrating operations and logic implemented by one embodiment of the IO discovery mechanism while performing storage discovery operations.

FIG. 9 shows a flowchart 900 illustrating operations and logic implemented by one embodiment of the mechanism while performing storage discovery operations. The logic begins in a block 902 corresponding to a request to perform a discover or rediscover operation. In response to the request, in a block 904 one or more of a compute node's BIOS, firmware, and/or operating system (OS) diagnostic facilities is used to discover the storage device capacity, health information, attachment link performance characteristics and drive performance information. In a block 904, this information discovered in block 902 is provided to the compute node's BMC or to the PSME for the pooled compute drawer the compute node is installed in, and the PSME forwards the information to the PODM. For example, for compute node 500 the information could be provided to BMC 518, which would forward it to PSME 408, which, in turn, would forward the discovered information to PODM 206.

In one embodiment, rediscovery is done whenever the PSME notifies the node BIOS/BMC to rediscover storage related information. BIOS is able to filter out discovering remote attached storage. As indicated by the EVENT arrows pointing to blocks 908, 910, and 912 and the return loops returning the logic from each of blocks 908, 910 and 912 to block 902, in one embodiment rediscovery is generally requested in response to the following events. (It is noted that rediscovery may be requested in response to other events not listed.)

1) A new node is added to a pooled system drawer or otherwise added to a PSME (block 908)
2) A node maintenance operation takes place (block 910)
3) A node is recomposed for a different client (block 912)

As depicted by a decision block 914, if the node has been offline for a period of Time T, re-verification of storage and health information is performed in a block 916.

Figure 10:
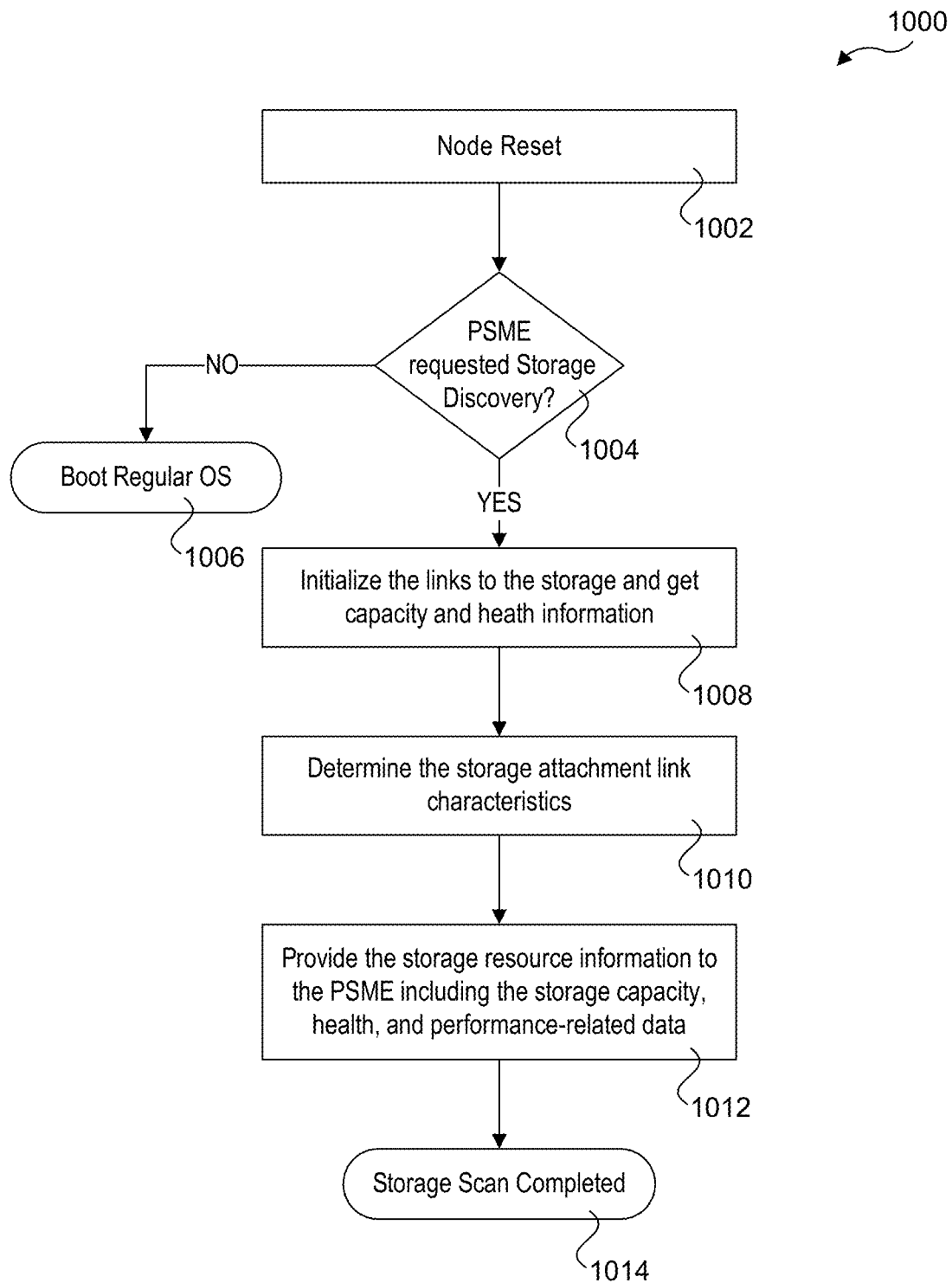
FIG. 10 is a flowchart illustrating operations and logic corresponding to one embodiment of a node storage resource discovery flow.

FIG. 10 shows a flowchart 1000 illustrating operations and logic corresponding to one embodiment of a node storage resource discovery flow. The process begins in a block 1002 in which a node reset event occurs. During the reset the node communicates with its PSME (e.g., the PSME for the system drawer the node is installed in) to determine whether the PSME has requested storage discovery, as depicted by a decision block 1004. In one embodiment, the PSME sets a storage discovery flag when a new node is added to a rack, on a maintenance event, or a change in any link/client attachment. If the answer is NO, a regular operating system boot is performed, as depicted by an end block 1006.

If the answer to decision block 1004 is YES, the logic proceeds to a block 1008 in which links to storage resources are initialized and information on storage capacity and health is gathered. Generally, the storage information may be retrieved by the BIOS or through use of an OS service. Drive health may be either detected by the storage device itself (e.g., a feature provided by SMART drives), or may be determined by an OS service (such as via performance of a health check service or the like).

Next, in a block 1010, the storage attachment link characteristics are determined. This information can be discovered dynamically by performing link latency tests, such as by sending a read or write request from a CPU to an attached storage device (noting this type of test is applicable for both storage devices directly connected to the CPU via physical links and storage devices in other system drawers connected over a virtual link). Optionally, all or a portion of this data can be gathered based on a particular platform design used by the node.

In a block 1012, the storage resource information is provided to the PSME, including the storage capacity, health, and performance related data gathered in blocks 1008 and 1010. This completes the storage scan process, as depicted by an end block 1014.

Once the PSME collects the processor, memory, storage, I/O capacity/health and performance related information, it communicates this information back to the PODM. Once the PODM collects information about all of the nodes in the rack, it will have full visibility into the available compute, memory, storage, and I/O resources available and can effectively compose new nodes based on user needs.

In one embodiment, re-harvesting of available rack resources is only performed when a PSME request that a node to perform a rediscovery operation in response to a hardware change or detected change in health. This improves the overall performance of the PODM compose operations and improves the boot speed by performing rediscovery operations only when needed.

Further aspects of the subject matter described herein are set out in the following numbered clauses:

1. A computer-implemented method, comprising:
   for each of a plurality of compute nodes in a pooled compute drawer installed in a rack,
   discovering storage resource characteristics for one or more storage resources in a pooled storage drawer installed in the rack and coupled in communication with the compute node via a respective attachment link between the compute node and the one or more storage resources;
   communicating the storage resource characteristics that are discovered to a configuration management entity for the rack; and
   determining, via the configuration management entity for the rack, the storage resource characteristics for each compute node.

2. The method of clause 1, wherein the storage resources in the pooled storage drawer include a plurality of storage drives, and wherein the storage resource characteristics include storage drive health information for at least a portion of the plurality of storage drives.

3. The method of clause 1 or 2, wherein the storage resource characteristics include a storage capacity for each of the one or more storage resources and attachment link performance characteristics for each attachment link.

4. The method of any of the preceding clauses, further comprising:
   for a compute node in the pooled compute drawer, performing a storage discovery process including,
   initializing an attachment link over which a storage resource in the pooled storage drawer is accessible to the compute node;
   acquiring capacity and health information for the storage resource accessible to the compute node over the attachment link; and
   determining storage attachment link characteristics for the attachment link.

5. The method of clause 4, wherein the pooled compute drawer in which the compute node is installed includes a drawer manager, the method further comprising:
   performing the storage discovery process for each of multiple compute nodes in the first pooled compute drawer;
   providing to the drawer manager, for each of the multiple compute nodes, capacity and health information for the one or more storage resources that are accessible to that compute node via one or more respective attachment links used by the compute node to access storage resources in the first pooled storage drawer and the storage attachment link characteristics for each attachment link.

6. The method of clause 5, further comprising:
   in response to a discovery event or discovery request,
   requesting, via the drawer manager, the compute node to perform the storage discovery process.

7. The method of clause 6, wherein the discovery event is one of:
a compute node being reset;
a new compute node being installed in the first pooled compute drawer; and
a compute node being recomposed.

8. The method of clause 4, wherein a compute node includes one or more local storage resources, and the method further includes determining local storage resource characteristics for the compute node that include at least one of performance and health characteristics for each of the one or more local storage resources and communicating the local storage resource characteristics for the compute node to the configuration management entity.

9. The method of any of the preceding clauses, wherein each of the plurality of compute nodes includes at least one processor and has access to at least one of local memory and shared memory from a shared memory pool, the method further comprising:
for each compute node;
communicating performance characteristics for each of the at least one processor to the configuration management entity; and
communicating capacity and performance characteristics for the at least one of local memory and shared memory accessed by the compute node to the configuration management entity.

10. The method of any of the preceding clauses, wherein an attachment link comprises a virtual link including one or more Peripheral Component Interconnect Express (PCIe) link segments traversing at least one PCIe switch.

11. The method of any of the preceding clauses, wherein the rack includes multiple pooled compute drawers, each having a configuration similar to the first pooled compute drawer, and multiple pooled storage drawers, each having a configuration similar to the first pooled storage drawer, and wherein the method further comprises:
for each of a plurality of compute nodes in each of the pooled compute drawers,
automatically discovering storage resource characteristics for one or more storage resources in a pooled storage drawer coupled in communication with the compute node via a respective attachment link between the compute node and the one or more storage resources;
communicating the storage resource characteristics that are discovered to a configuration management entity for the rack; and
aggregating, via the configuration management entity for the rack, the storage resource characteristics for each compute node.

12. A pooled compute drawer, configured to be installed in a rack including a pooled storage drawer having a plurality of storage resources coupled to an input-output (IO) switch and including at least one IO port, the pooled compute drawer comprising:
a plurality of compute nodes, each compute node including,
one or more processors;
one or more memory resources, operatively coupled to the processor; and
an IO interface;
one or more IO ports, each IO port configured to be coupled to an end of a respective IO cable that has an opposing end coupled to a respective IO port in the pooled storage drawer when the pooled compute drawer is installed in the rack; and
IO infrastructure including a IO interconnect, configured to couple each compute node to at least one of the one or more IO ports;
wherein each of the plurality of compute nodes is configured to access one or more storage resource in the pooled storage drawer when the pooled compute drawer is installed in the rack, the access to a storage resource for a given compute node being facilitated over a virtual attachment link coupling the compute node in communication with the storage resource,
and wherein each of the plurality of compute nodes is further configured to discover storage resource characteristics for one or more storage resources in the pooled storage drawer the compute node is enabled to access via one or more respective attachment links coupling the compute node to the one or more storage resource, wherein the storage resource characteristics include a storage capacity for each of the one or more storage resources and attachment link performance characteristics for each of the one or more attachment links.

13. The pooled compute drawer of clause 12, wherein the storage resources in the first pooled storage drawer include a plurality of storage drives, and wherein the storage resource characteristics include at least one of storage drive health information and storage drive performance information.

14. The pooled compute drawer of clause 12 or 13, wherein a compute node is configured to perform a storage discover process comprising:
for each of one or more storage resources in the pooled storage drawer,
initializing an attachment link coupling the compute node in communication with the storage resource;
acquiring capacity and health information for the storage resource; and
determining attachment link characteristics for the attachment link.

15. The pooled compute drawer of any of clauses 12-14, further comprising a drawer manager, wherein each compute node is configured to provide storage resource characteristics including capacity and health information for the one or more storage resources that are accessible to that compute node via the one or more attachment links used by the compute node to access storage resources in the pooled storage drawer and the storage attachment link characteristics for each of the one or more attachment links to the drawer manager.

16. The pooled compute drawer of clause 15, wherein the drawer manager is configured to request that a compute node perform a discovery process in response to one or more of the following events:
a compute node being reset,
a new compute node being installed in the pooled compute drawer, and
a compute node being recomposed.

17. The pooled compute drawer of clause 15 or 16, wherein each compute node is configured to:
communicate performance characteristics for each of its one or more processors to the drawer manager; and
communicate capacity and performance characteristics for its one or more memory resources to the drawer manager.

18. The pooled compute drawer of any of clauses 15-17, wherein one or more of the compute nodes includes at least one local storage resource, and each of the one or more compute nodes is configured to report at least one of capacity and health information for the at least one local storage resource included in that compute node.

19. The pooled compute drawer of any of clauses 15-18, wherein the rack includes a pod manager that is communicatively coupled to the drawer manager when the pooled compute drawer is installed in the rack, and wherein the drawer manager is further configured to forward, for each compute node, the storage resource characteristics provided to the drawer manager from that compute node to the pod manager.

20. The pooled compute drawer of any of clauses 15-19, wherein at least one of the computer nodes includes a baseboard management controller (BMC), coupled between a processor of the compute node and the drawer manager.

21. The pooled compute drawer of any of clauses 12-20, wherein the pooled compute drawer includes a plurality of local IO resources, selected connected to at least a portion of the plurality of compute nodes, and wherein at least one compute node is configured to discovery configuration information pertaining to the plurality of local IO resources.

22. The pooled compute drawer of clause 21, wherein the plurality of local IO resources includes at least one of:
one or more dual inline memory modules (DIMMs); and
one or more non-volatile dual inline memory modules (NVDIMMs);

23. The pooled compute drawer of any of clauses 12-22, wherein the plurality of compute nodes includes a plurality of Intel Xeon processors.

24. The pooled compute drawer of any of clauses 12-22, wherein the plurality of compute nodes includes a plurality of Intel Atom processors.

25. A rack comprising:
a rack frame, having a plurality of pooled system drawers installed therein, including,
a pooled compute drawer including,
a plurality of compute nodes, each having one or more processors and one or more memory resources,
at least one input-output (IO) port; and
IO infrastructure communicatively coupled each compute node to an IO port;
a pooled storage drawing including,
a plurality of storage resources;
at least one IO port; and
IO infrastructure communicatively coupling each storage resource to at least one IO port; and
at least one IO cable coupled between respective IO ports on the pooled compute drawer and the pooled storage drawer,
wherein each compute node is configured to be selectively-coupled to one or more storage resources in the pooled storage drawer over a respective attachment link coupling the compute node in communication with a respective storage resource,
and wherein each of the plurality of compute nodes is further configured to discover storage resource characteristics for the one or more storage resources in the pooled storage drawer the compute node is configured to be selectively-coupled to, wherein the storage resource characteristics for each storage resource includes a storage capacity for the storage resource and attachment link performance characteristics for the attachment link over which the compute node is configured to be selectively-coupled.

26. The rack of clause 25, wherein the storage resources in the pooled storage drawer include a plurality of storage drives, and wherein the storage resource characteristics include at least one of storage drive health information and storage drive performance information.

27. The rack of clause 25 or 26, wherein a compute node is configured to perform a storage discovery process comprising:
initializing an attachment link coupling the compute node in communication with a storage resource in the pooled storage drawer;
acquiring capacity and health information for the storage resource; and
determining storage attachment link characteristics for the attachment link.

28. The rack of any of clauses 25-27, wherein the rack includes a pod manager and the pooled compute drawer includes a drawer manager communicatively coupled to the pod manager, wherein each compute node is configured to provide to the drawer manager the storage resource characteristics including capacity and health information for the one or more storage resources in the pooled storage drawer to which the compute node is configured to be selectively-coupled, and wherein the drawer manager is configured to send the storage resource characteristics it is provided by each compute node to the pod manager.

29. The rack of clause 28, wherein the drawer manager is configured to request that a compute node perform a discovery process in response to one or more of the following events:
a compute node being reset,
a new compute node being installed in the pooled compute drawer, and
a compute node being recomposed for a different client.

30. The rack of clause 28 or 29, wherein each compute node is configured to:
communicate performance characteristics for each of its one or more processors to the drawer manager; and
communicate capacity and performance characteristics for its one or more memory resources to the drawer manager.

31. The rack of any of clauses 25-30, wherein the system includes a plurality of pooled compute drawers.

32. The rack of any of clauses 25-31, wherein the system includes a plurality of pooled storage drawers.

23. The rack of any of clauses 25-32, further comprising a pooled IO drawer.

34. The rack of any of clauses 25-33, further comprising a pooled memory drawer.

35. The rack of any of clauses 25-34, wherein the plurality of compute nodes includes a plurality of Intel Xeon processors.

36. The rack of any of clauses 25-34, wherein the plurality of compute nodes includes a plurality of Intel Atom processors.

37. At least one non-transitory machine readable medium having instructions stored thereon, configured to be executed in a distributed manner on a plurality of processing entities in a rack in which a plurality pooled system drawers are installed, wherein distributed execution of the instructions on the plurality of processing entities performs operations comprising:
for each of a plurality of compute nodes in a pooled compute drawer installed in a rack,
discovering storage resource characteristics for one or more storage resources in a pooled storage drawer installed in the rack and coupled in communication with the compute node via a respective attachment link between the compute node and the one or more storage resources;

communicating the storage resource characteristics that are discovered to a configuration management entity for the rack; and determining, via the configuration management entity for the rack, the storage resource characteristics for each compute node.

38. The least one non-transitory machine readable medium of clause 37, wherein the storage resources in the pooled storage drawer include a plurality of storage drives, and wherein the storage resource characteristics include storage drive health information for at least a portion of the plurality of storage drives.

39. The least one non-transitory machine readable medium of clause 37 or 38, wherein the storage resource characteristics include a storage capacity for each of the one or more storage resources and attachment link performance characteristics for each attachment link.

40. The least one non-transitory machine readable medium of any of clauses 37-39, wherein distributed execution of the instructions performs further operations, comprising:

for a compute node in the pooled compute drawer, performing a storage discovery process including, initializing an attachment link over which a storage resource in the pooled storage drawer is accessible to the compute node;

acquiring capacity and health information for the storage resource accessible to the compute node over the attachment link; and determining storage attachment link characteristics for the attachment link.

41. The least one non-transitory machine readable medium of clause 40, wherein the first pooled compute drawer in which the compute node is installed includes a drawer manager, and wherein distributed execution of the instructions performs further operations, comprising:

performing the storage discovery process for each of multiple compute nodes in the first pooled compute drawer;

providing to the drawer manager, for each of the multiple compute nodes, capacity and health information for the one or more storage resources that are accessible to that compute node via one or more respective attachment links used by the compute node to access storage resources in the first pooled storage drawer and the storage attachment link characteristics for each attachment link.

42. The least one non-transitory machine readable medium of clause 41, wherein distributed execution of the instructions performs further operations, comprising:

in response to a discovery event or discovery request, requesting, via the drawer manager, the compute node to perform the storage discovery process.

43. The least one non-transitory machine readable medium of clause 42, wherein the discovery event is one of:
a compute node being reset;
a new compute node being installed in the first pooled compute drawer; and
a compute node being recomposed.

44. The least one non-transitory machine readable medium of clause 39, wherein a compute node includes one or more local storage resources, and wherein distributed execution of the instructions performs further operations including determining local storage resource characteristics for the compute node that include at least one of performance and health characteristics for each of the one or more local storage resources and communicating the local storage resource characteristics for the compute node to the configuration management entity.

45. The least one non-transitory machine readable medium of any of clauses 37-44, wherein each of the plurality of compute nodes includes at least one processor and has access to at least one of local memory and shared memory from a shared memory pool, wherein distributed execution of the instructions performs further operations, comprising:

for each compute node;
communicating performance characteristics for each of the at least one processor to the configuration management entity; and
communicating capacity and performance characteristics for the at least one of local memory and shared memory accessed by the compute node to the configuration management entity.

46. The least one non-transitory machine readable medium of any of clauses 37-45, wherein an attachment link comprises a virtual link including one or more Peripheral Component Interconnect Express (PCIe) link segments traversing at least one PCIe switch.

47. The least one non-transitory machine readable medium of any of clauses 37-46, wherein the rack includes multiple pooled compute drawers, each having a configuration similar to the first pooled compute drawer, and multiple pooled storage drawers, each having a configuration similar to the first pooled storage drawer, and wherein distributed execution of the instructions performs further operations, comprising:

for each of a plurality of compute nodes in each of the pooled compute drawers,
automatically discovering storage resource characteristics for one or more storage resources in a pooled storage drawer coupled in communication with the compute node via a respective attachment link between the compute node and the one or more storage resources;
communicating the storage resource characteristics that are discovered to a configuration management entity for the rack; and
aggregating, via the configuration management entity for the rack, the storage resource characteristics for each compute node.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including one or more computer-readable or machine-readable non-transitory storage mediums, which provides content that represents instructions that can be executed. In one embodiment, the instructions are configured to be executed in a distributed manner on multiple distributed processing elements in the rack to perform various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A computer-implemented method, comprising:
for each of a plurality of compute nodes in a pooled compute drawer installed in a rack,
discovering storage resource characteristics for one or more storage resources in a pooled storage drawer installed in the rack and coupled in communication with the compute node via a respective attachment link between the compute node and the one or more storage resources;
communicating the storage resource characteristics that are discovered to a configuration management entity for the rack; and
determining, via the configuration management entity for the rack, the storage resource characteristics for each compute node,
wherein an attachment link includes a link segment comprising a cable having a first end coupled to a port in the pooled compute drawer and a second end coupled to a port in the pooled storage drawer.

2. The method of claim 1, wherein the storage resources in the pooled storage drawer include a plurality of storage drives, and wherein the storage resource characteristics include storage drive health information for at least a portion of the plurality of storage drives.

3. The method of claim 1, wherein the storage resource characteristics include a storage capacity for each of the one or more storage resources and attachment link performance characteristics for each attachment link.

4. The method of claim 1, further comprising:
for a compute node in the pooled compute drawer, performing a storage discovery process including,
initializing an attachment link over which a storage resource in the pooled storage drawer is accessible to the compute node;
acquiring capacity and health information for the storage resource accessible to the compute node over the attachment link; and
determining storage attachment link characteristics for the attachment link.

5. The method of claim 4, wherein the pooled compute drawer in which the compute node is installed includes a drawer manager, the method further comprising:
performing the storage discovery process for each of multiple compute nodes in the first pooled compute drawer;
providing to the drawer manager, for each of the multiple compute nodes, capacity and health information for the one or more storage resources that are accessible to that compute node via one or more respective attachment links used by the compute node to access storage resources in the first pooled storage drawer and the storage attachment link characteristics for each attachment link.

6. The method of claim 5, further comprising:
in response to a discovery event or discovery request,
requesting, via the drawer manager, the compute node to perform the storage discovery process.

7. The method of claim 6, wherein the discovery event is one of:
a) a compute node being reset;
b) a new compute node being installed in the first pooled compute drawer; and
c) a compute node being recomposed.

8. The method of claim 4, wherein a compute node includes one or more local storage resources, and the method further includes determining local storage resource characteristics for the compute node that include at least one of performance and health characteristics for each of the one or more local storage resources and communicating the local storage resource characteristics for the compute node to the configuration management entity.

9. The method of claim 1, wherein each of the plurality of compute nodes includes at least one processor and has access to at least one of local memory and shared memory from a shared memory pool, the method further comprising:
for each compute node;
communicating performance characteristics for each of the at least one processor to the configuration management entity; and
communicating capacity and performance characteristics for the at least one of local memory and shared memory accessed by the compute node to the configuration management entity.

10. The method of claim 1, wherein a portion of an attachment link comprises a virtual link segment including one or more Peripheral Component Interconnect Express (PCIe) link segments traversing at least one PCIe switch, and wherein the first end of the cable is coupled to a PCIe port in the PCIe switch.

11. The method of claim 1, wherein the rack includes multiple pooled compute drawers, each having a configuration similar to the first pooled compute drawer, and multiple pooled storage drawers, each having a configuration similar to the first pooled storage drawer, and wherein the method further comprises:
for each of a plurality of compute nodes in each of the pooled compute drawers,
automatically discovering storage resource characteristics for one or more storage resources in a pooled storage drawer coupled in communication with the compute node via a respective attachment link between the compute node and the one or more storage resources;
communicating the storage resource characteristics that are discovered to a configuration management entity for the rack; and
aggregating, via the configuration management entity for the rack, the storage resource characteristics for each compute node.

12. A pooled compute drawer, configured to be installed in a rack including a pooled storage drawer having a plurality of storage resources coupled to an input-output (TO) switch and including at least one IO port, the pooled compute drawer comprising:
a plurality of compute nodes, each compute node including,
one or more processors;
one or more memory resources, operatively coupled to the processor; and
an IO interface;
one or more IO ports, each IO port configured to be coupled to an end of a respective IO cable that has an opposing end coupled to a respective IO port in the pooled storage drawer when the pooled compute drawer is installed in the rack; and
IO infrastructure including an IO interconnect, configured to couple each compute node to at least one of the one or more IO ports;
wherein each of the plurality of compute nodes is configured to access one or more storage resource in the pooled storage drawer when the pooled compute drawer is installed in the rack, the access to a storage resource for a given compute node being facilitated over a virtual attachment link coupling the compute node in communication with the storage resource,
and wherein each of the plurality of compute nodes is further configured to discover storage resource characteristics for one or more storage resources in the pooled storage drawer the compute node is enabled to access via one or more respective attachment links coupling the compute node to the one or more storage resource, wherein the storage resource characteristics include a storage capacity for each of the one or more storage resources and attachment link performance characteristics for each of the one or more attachment links.

13. The pooled compute drawer of claim 12, wherein the storage resources in the first pooled storage drawer include a plurality of storage drives, and wherein the storage resource characteristics include at least one of storage drive health information and storage drive performance information.

14. The pooled compute drawer of claim 12, wherein a compute node is configured to perform a storage discover process comprising:

for each of one or more storage resources in the pooled storage drawer,
initializing an attachment link coupling the compute node in communication with the storage resource;
acquiring capacity and health information for the storage resource; and
determining attachment link characteristics for the attachment link.

15. The pooled compute drawer of claim 12, further comprising a drawer manager, wherein each compute node is configured to provide storage resource characteristics including capacity and health information for the one or more storage resources that are accessible to that compute node via the one or more attachment links used by the compute node to access storage resources in the pooled storage drawer and the storage attachment link characteristics for each of the one or more attachment links to the drawer manager.

16. The pooled compute drawer of claim 15, wherein the drawer manager is configured to request that a compute node perform a discovery process in response to one or more of the following events:
a) a compute node being reset,
b) a new compute node being installed in the pooled compute drawer, and
c) a compute node being recomposed.

17. The pooled compute drawer of claim 15, wherein each compute node is configured to:
communicate performance characteristics for each of its one or more processors to the drawer manager; and
communicate capacity and performance characteristics for its one or more memory resources to the drawer manager.

18. The pooled compute drawer of claim 15, wherein one or more of the compute nodes includes at least one local storage resource, and each of the one or more compute nodes is configured to report at least one of capacity and health information for the at least one local storage resource included in that compute node.

19. The pooled compute drawer of claim 15, wherein the rack includes a pod manager that is communicatively coupled to the drawer manager when the pooled compute drawer is installed in the rack, and wherein the drawer manager is further configured to forward, for each compute node, the storage resource characteristics provided to the drawer manager from that compute node to the pod manager.

20. A rack comprising:
a rack frame, having a plurality of pooled system drawers installed therein, including,
a pooled compute drawer including,
a plurality of compute nodes, each having one or more processors and one or more memory resources,
at least one input-output (TO) port; and
IO infrastructure communicatively coupling each compute node to an IO port;
a pooled storage drawer including,
a plurality of storage resources;
at least one IO port; and
IO infrastructure communicatively coupling each storage resource to at least one IO port; and
at least one IO cable having first and second ends respectively coupled to respective IO ports on the pooled compute drawer and the pooled storage drawer,
wherein each compute node is configured to be selectively-coupled to one or more storage resources in the pooled storage drawer over a respective attachment link coupling the compute node in communication with a respective storage resource,
and wherein each of the plurality of compute nodes is further configured to discover storage resource characteristics for the one or more storage resources in the pooled storage drawer the compute node is configured to be selectively-coupled to, wherein the storage resource characteristics for each storage resource includes a storage capacity for the storage resource and attachment link performance characteristics for the attachment link over which the compute node is configured to be selectively-coupled.

21. The rack of claim 20, wherein the storage resources in the pooled storage drawer include a plurality of storage drives, and wherein the storage resource characteristics include at least one of storage drive health information and storage drive performance information.

22. The rack of claim 20, wherein a compute node is configured to perform a storage discovery process comprising:
initializing an attachment link coupling the compute node in communication with a storage resource in the pooled storage drawer;
acquiring capacity and health information for the storage resource; and
determining storage attachment link characteristics for the attachment link.

23. The rack of claim 20, wherein the rack includes a pod manager and the pooled compute drawer includes a drawer manager communicatively coupled to the pod manager, wherein each compute node is configured to provide to the drawer manager the storage resource characteristics including capacity and health information for the one or more storage resources in the pooled storage drawer to which the compute node is configured to be selectively-coupled, and wherein the drawer manager is configured to send the storage resource characteristics it is provided by each compute node to the pod manager.

24. The rack of claim 23, wherein the drawer manager is configured to request that a compute node perform a discovery process in response to one or more of the following events:
a) a compute node being reset,
b) a new compute node being installed in the pooled compute drawer, and
c) a compute node being recomposed for a different client.

25. The rack of claim 23, wherein each compute node is configured to:
communicate performance characteristics for each of its one or more processors to the drawer manager; and
communicate capacity and performance characteristics for its one or more memory resources to the drawer manager.

26. At least one non-transitory machine readable medium having instructions stored thereon, configured to be executed in a distributed manner on a plurality of processing entities in a rack in which a plurality pooled system drawers are installed, wherein distributed execution of the instructions on the plurality of processing entities performs operations comprising:

for each of a plurality of compute nodes in a pooled compute drawer installed in a rack,
    discovering storage resource characteristics for one or more storage resources in a pooled storage drawer installed in the rack and coupled in communication with the compute node via a respective attachment link between the compute node and the one or more storage resources;
    communicating the storage resource characteristics that are discovered to a configuration management entity for the rack; and
determining, via the configuration management entity for the rack, the storage resource characteristics for each compute node,
wherein an attachment link includes a link segment comprising a cable having a first end coupled to a port in the pooled compute drawer and a second end coupled to a port in the pooled storage drawer.

27. The least one non-transitory machine readable medium of claim 26, wherein the storage resources in the pooled storage drawer include a plurality of storage drives, and wherein the storage resource characteristics include storage drive health information for at least a portion of the plurality of storage drives.

28. The least one non-transitory machine readable medium of claim 26, wherein the storage resource characteristics include a storage capacity for each of the one or more storage resources and attachment link performance characteristics for each attachment link.

29. The least one non-transitory machine readable medium of claim 26, wherein distributed execution of the instructions performs further operations, comprising:
    for a compute node in the pooled compute drawer, performing a storage discovery process including,
        initializing an attachment link over which a storage resource in the pooled storage drawer is accessible to the compute node;
        acquiring capacity and health information for the storage resource accessible to the compute node over the attachment link; and
        determining storage attachment link characteristics for the attachment link.

30. The least one non-transitory machine readable medium of claim 29, wherein the first pooled compute drawer in which the compute node is installed includes a drawer manager, and wherein distributed execution of the instructions performs further operations, comprising:
    performing the storage discovery process for each of multiple compute nodes in the first pooled compute drawer;
    providing to the drawer manager, for each of the multiple compute nodes, capacity and health information for the one or more storage resources that are accessible to that compute node via one or more respective attachment links used by the compute node to access storage resources in the first pooled storage drawer and the storage attachment link characteristics for each attachment link.

* * * * *